(12) United States Patent
Twarakavi et al.

(10) Patent No.: US 12,118,755 B2
(45) Date of Patent: Oct. 15, 2024

(54) STOCHASTIC COMPRESSION OF RASTER DATA

(71) Applicant: International Business Machines Corporation, Armonk, NY (US)

(72) Inventors: Navin Twarakavi, Bangarole (IN); Fred Ochieng Otieno, Nairobi (KE); Kamal Chandra Das, New Delhi (IN); Jitendra Singh, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 17/544,436

(22) Filed: Dec. 7, 2021

(65) Prior Publication Data

US 2023/0177730 A1   Jun. 8, 2023

(51) Int. Cl.
*G06T 9/00* (2006.01)

(52) U.S. Cl.
CPC ..................... *G06T 9/00* (2013.01)

(58) Field of Classification Search
CPC ................. G06T 9/00; G06T 9/002
See application file for complete search history.

(56) References Cited

U.S. PATENT DOCUMENTS

| | | | |
|---|---|---|---|
| 6,330,363 B1 * | 12/2001 | Accad | G06T 9/00 382/232 |
| 7,043,077 B2 | 5/2006 | Rijavec | |
| 8,493,612 B2 * | 7/2013 | Sweet | G06K 15/1861 358/1.9 |
| 8,983,185 B2 * | 3/2015 | Deng | H04N 19/136 382/167 |
| 9,338,257 B2 * | 5/2016 | Ur | H04L 65/75 |
| 9,819,964 B2 * | 11/2017 | Maurer | H04N 19/146 |
| 10,594,890 B2 * | 3/2020 | Lu | H03M 7/3059 |
| 10,909,725 B2 | 2/2021 | Mammou et al. | |

(Continued)

FOREIGN PATENT DOCUMENTS

| | | |
|---|---|---|
| CN | 105118049 A | 12/2015 |
| WO | 2017158622 A2 | 9/2017 |

OTHER PUBLICATIONS

Cloud-based adaptive compression and secure management services for 3D healthcare data—Arcangelo Castiglione et al.,i, Cloud-based adaptive compression and secure management services for 3D healthcare data, 2015, Future Generation Computer Systems, vols. 43-44, pp. 120-134, ISSN 0167-739X (Year: 2015).*

(Continued)

*Primary Examiner* — Vu Le
*Assistant Examiner* — Jack Peter Kraynak
(74) *Attorney, Agent, or Firm* — Ryan, Mason & Lewis, LLP

(57) ABSTRACT

Methods, systems, and computer program products for stochastic compression of raster data are provided herein. A computer-implemented method includes obtaining at least one compression ratio and at least one error value for a given set of raster data; compressing at least a portion of the given set of raster data based at least in part on the at least one compression ratio and the at least one error value; transmitting the compressed raster data, to at least one given destination, based at least in part on a given transmission speed variable; and performing one or more automated actions based at least in part on the transmitted compressed raster data.

20 Claims, 11 Drawing Sheets

(56) References Cited

U.S. PATENT DOCUMENTS

| | | | |
|---|---|---|---|
| 11,754,716 B2* | 9/2023 | Yang | G01C 21/3867 |
| | | | 382/232 |
| 2018/0167083 A1* | 6/2018 | Dubey | H03M 7/6076 |
| 2020/0351075 A1* | 11/2020 | Griffin | H04N 21/23109 |
| 2022/0050211 A1* | 2/2022 | Bennington | G01S 19/06 |
| 2022/0270209 A1* | 8/2022 | Mironica | G06N 3/045 |

OTHER PUBLICATIONS

Wai et al., GIS Data Compression Based On Block Encoding and Quadtree Approach, International Conference on Advances in Engineering and Technology (ICAET'2014), Mar. 2014.

Franti et al., Map Image Compression for Real-Time Applications, Map Image Compression for Real-Time Applications, 2002.

North-Road.com, SLYR ESRI to QGIS Compatibility Suite, Oct. 2019.

Zhu et al., Deep Learning in Remote Sensing: A Review, Oct. 2017.

Parui et al., Sketch-based Image Retrieval from Millions of Images under Rotation, Translation and Scale Variations, Oct. 2015.

Chen et al., Shape-Adaptive Image Compression Using Lossy Shape Coding, SA-Prediction, and SA-Deblocking, 2016.

Radosavljevic et al., Lossy Compression of Multispectral Satellite Images with Application to Crop Thematic Mapping: A HEVC Comparative Study, Remote Sens. 2020, 12(10), 1590.

Yang et al., Superpixel Segmentation with Fully Convolutional Networks, CVPR, 2020.

Figueira, J.P., Fast Geospatial Indexing with H3, Jul. 2020.

\* cited by examiner

STOCHASTIC COMPRESSION OF RASTER DATA

BACKGROUND

The present application generally relates to information technology and, more particularly, to data processing techniques. More specifically, geo-spatial raster data (such as, for example, satellite imagery data) are increasingly changing the way in which spatial information is analyzed. However, using conventional data processing techniques, a trade-off exists between the ability to use raster data and the size of raster data because of the significant costs of computing and transmitting such data.

SUMMARY

In at least one embodiment, techniques for stochastic compression of raster data are provided. An example computer-implemented method includes obtaining at least one compression ratio and at least one error value for a given set of raster data, and compressing at least a portion of the given set of raster data based at least in part on the at least one compression ratio and the at least one error value. The method also includes transmitting the compressed raster data, to at least one given destination, based at least in part on a given transmission speed variable, and performing one or more automated actions based at least in part on the transmitted compressed raster data.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
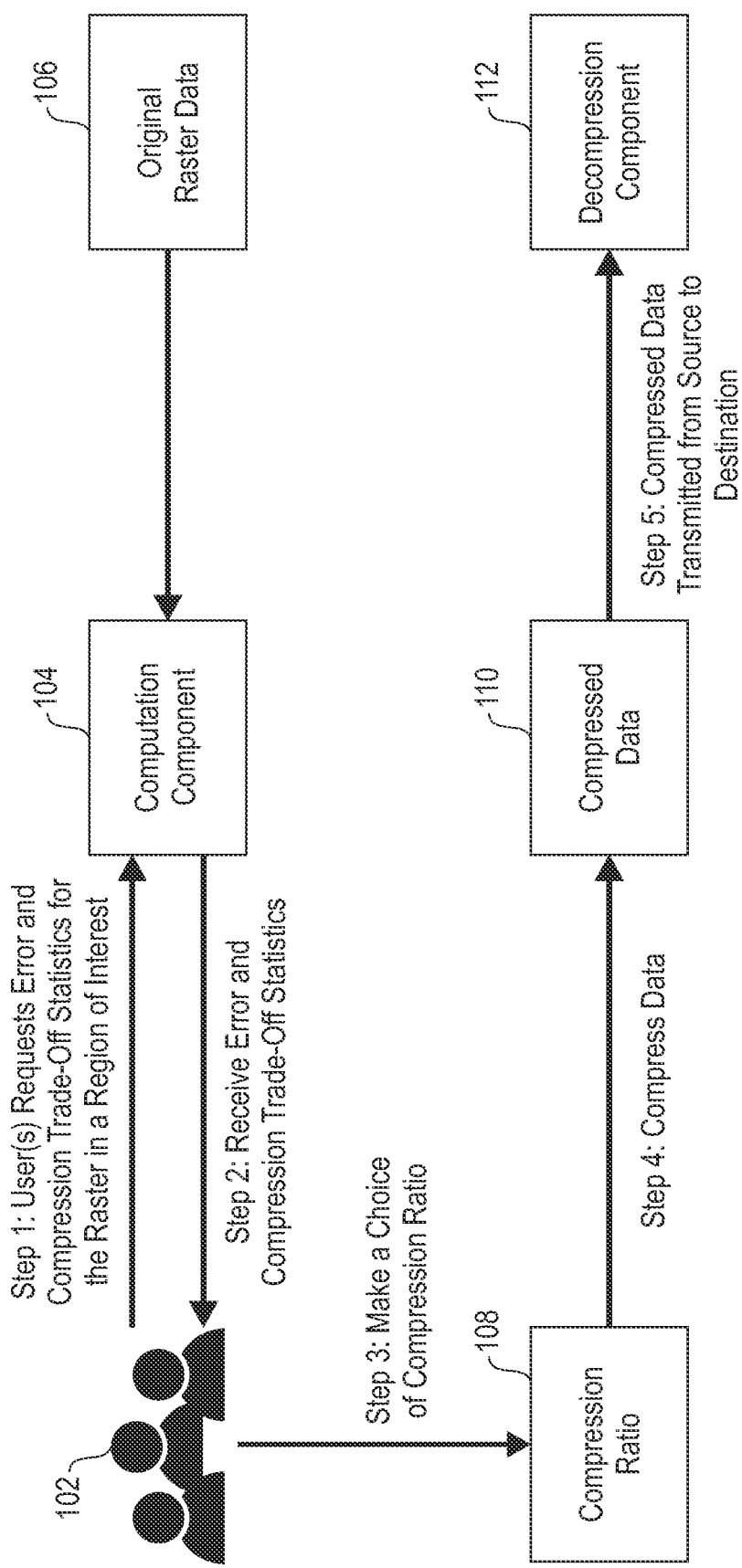
FIG. 1 is a diagram illustrating system architecture, according to an example embodiment of the invention.

As described herein, at least one embodiment includes stochastic compression of raster data. Such an embodiment can include compressing raster data (e.g., multiple raster data layers) wherein the uncertainty of at least one pixel-level observation is considered. For example, one or more embodiments include implementing an encoding technique which uses at least one user-defined uncertainty and/or error value to compress a single raster layer by aggregating spatial-contiguous pixels into clusters, conserving the spatial statistics within each cluster, and saving the compressed data to a specific file format (e.g., .SLYR format).

Additionally or alternatively, such an embodiment can include implementing an encoding technique which uses at least one user-defined uncertainty and/or error value to compress multiple raster layers into a single file by aggregating spatial-contiguous pixels across multiple raster layers into clusters, conserving the spatial statistics within each cluster; and saving the compressed data to a specific file format (e.g., .SLYR format). Further, one or more embodiments can include implementing an encoding technique that compresses a large raster layer by breaking the layer down to tiles and compressing each of the tiles using a SLYR approach. As used herein, a large raster layer is characterized by high spatial resolution for provisioning of a greater level of detail of features represented by the raster, which may, for example, require allocation of storage and processing resources for the raster (e.g., in connection with multi-spectral and/or hyper-spectral satellite imagery). Using at least one user-defined uncertainty value and/or error value, the large raster can be split into tiles based on preset size thresholds. For each of the tiles, at least one embodiment includes generating spatially contiguous clusters with a standard deviation of less than an acceptable error. The spatial statistics for each cluster in every tile are conserved and the compressed data is saved to a specific file format (e.g., the .SLYR format file).

At least one encoding technique such as noted above can include automatically assigning an acceptable error value to be used in one or more compression tasks (e.g., using the SLYR approach) by considering the type of raster file. Also, in one or more embodiments, such an encoding technique includes compressing raster data for different timelines in at least one given area by removing spatial and temporal redundancies (e.g., using the SLYR approach), and such an embodiment can also include implementing a decoding technique to decompress the compressed file (e.g., the .SLYR format file) to create one or more uncompressed raster layers.

As used herein, raster data refers to a spatial data model including rows and columns of cells, wherein each cell contains an attribute value identifying its color and location coordinate. Geospatial raster data (e.g., satellite images, aerial photographs, etc.) are typically larger on average than vector data (e.g., points, lines, or polygons). As also used herein, compression refers to a process of making data more compact such that the data occupy less disk storage space. Benefits of compressing raster data can include, for example, reduction in file size, improved performance over a network (because the user is transferring less data from a server to an application), etc. Also, compression ratio refers to the amount or degree of reduction of a file's size, for example, expressed as the ratio of the file's original size to the file's target size. For example, if a file was originally 20 megabytes (MB), and after compression the file is 2 MB, that equates to a 10:1 compression ratio.

Further, as used herein, lossless compression refers to a class of data compression that allows the original data to be identically reconstructed from the compressed data. For example, lossless compression can be used in cases wherein it is important that the original data and the decompressed data be identical and/or wherein deviations from the original data can be deleterious. Also, lossy compression refers to a class of data encoding methods that uses inexact approximations and/or partial data discarding for representing the content that has been encoded. Such compression techniques can be used, for example, to reduce the amount of data that would otherwise be needed to store, handle, and/or transmit the represented content. Additionally, as used herein, decoding refers to a process of decompressing data such that the data can be viewed. Often, for example, a user of compressed data uses software that can view the raster image.

Accordingly, one or more embodiments include providing the user, upon request, a compression ratio and error trade-off value for a given multi-dimensional raster. Such an embodiment can include enabling a user to select at least one compression ratio and error trade-off value for the user's needs or automatically selecting an optimal compression ratio and error trade-off value for the user. Additionally, as further detailed herein, at least one embodiment includes compressing raster data based at least in part on the chosen compression ratio, transmitting the encoded file as a file and/or as one or more fileless key-pairs, based on the transmission speed, to the destination, and decompressing the transmitted encoded file at the destination to calculate the uncompressed raster data.

FIG. 1 is a diagram illustrating system architecture, according to an embodiment of the invention. By way of illustration, FIG. 1 depicts one or more users 102 and original raster data 106. As also depicted in the FIG. step 1 includes the user(s) 102 requesting, from computation component 104, error and compression trade-off statistics for at least a portion of the raster data 106 in at least one region of interest. In connection with step 1, computation component 104 estimates, for at least a portion of raster data 106, the trade-offs between compression ratio and error due to compression, and stores (e.g., as a queryable table) such computations in a database (which can be resident on and/or connected to computation component 104) for the user to query.

As also illustrated in FIG. 1, step 2 includes the user(s) 102 receiving the requested error versus compression trade-off statistics from computation component 104. Step 3 includes the user(s) making a choice (based at least in part on the received statistics in step 2) of a compression ratio 108 and/or facilitating an automated selection of a compression ratio 108 to be made on behalf of the user(s) 102. Subsequently, and based at least in part on the selected compression ratio 108, step 4 includes compressing the at least a portion of raster data 106.

In at least one embodiment, compressing the raster data can include implementing encoding techniques that use a user-defined uncertainty or error value to compress a single raster layer by aggregating spatial-contiguous pixels into clusters, conserving the spatial statistics within each cluster, and saving and/or storing the compressed data 110 to a specific file format (e.g., .SLYR format). Additionally or alternatively, compressing the raster data can include implementing encoding techniques that use a user-defined uncertainty or error value to compress multiple raster layers into a single file by aggregating spatial-contiguous pixels across multiple raster layers into clusters, conserving the spatial statistics within each cluster; and saving and/or storing the compressed data 110 to a specific file format (e.g., .SLYR format). Additionally or alternatively, compressing the raster data can include implementing encoding techniques that compress a large raster layer by breaking the layer down to multiple tiles and compressing each of the tiles using the SLYR approach. Using at least one user-defined uncertainty and/or error value, the large raster layer is split into tiles based on preset size thresholds. For each of the tiles, such an embodiment can include generating spatially contiguous clusters with a standard deviation less than the acceptable error. The spatial statistics for each cluster in every tile, together with metadata of the original file, are conserved and the compressed data is saved to a specific file format (e.g., the .SLYR format file). Further, in at least one embodiment, compressing the raster data can include implementing one or more machine learning techniques.

By way of example, using an autoencoder model on an entire data layer of past data and a land use map, one or more embodiments can include calculating and storing errors and compression ratio data for the data layer for each land use map category and time period. For a given user-defined region of interest, period and acceptable error, and/or compression ratio, at least one embodiment can include verifying if the user-defined requirements are met on the stored errors and compression ratio data. If a match is determined for the user-defined inputs, such an embodiment can include returning the encoded raster and model. If there was no match, such an embodiment includes returning the best errors and compression options to the user for his or her selection, and upon the user sending a new option, returning the model and encoded raster corresponding to the selected option.

Referring again to FIG. 1, step 5 includes transmitting the compressed data 110 from at least one source to at least one destination. In one or more embodiment, such data transmission allows for optimal delivery of data from source to destination. As also depicted in FIG. 1, decompression component 112 decompress at least a portion of the compressed data at the given at least one destination. In at least one embodiment decompressing the compressed data can include implementing decoding techniques which include decompressing the .SLYR format file to create at least one decompressed raster layer of data.

Figure 2:
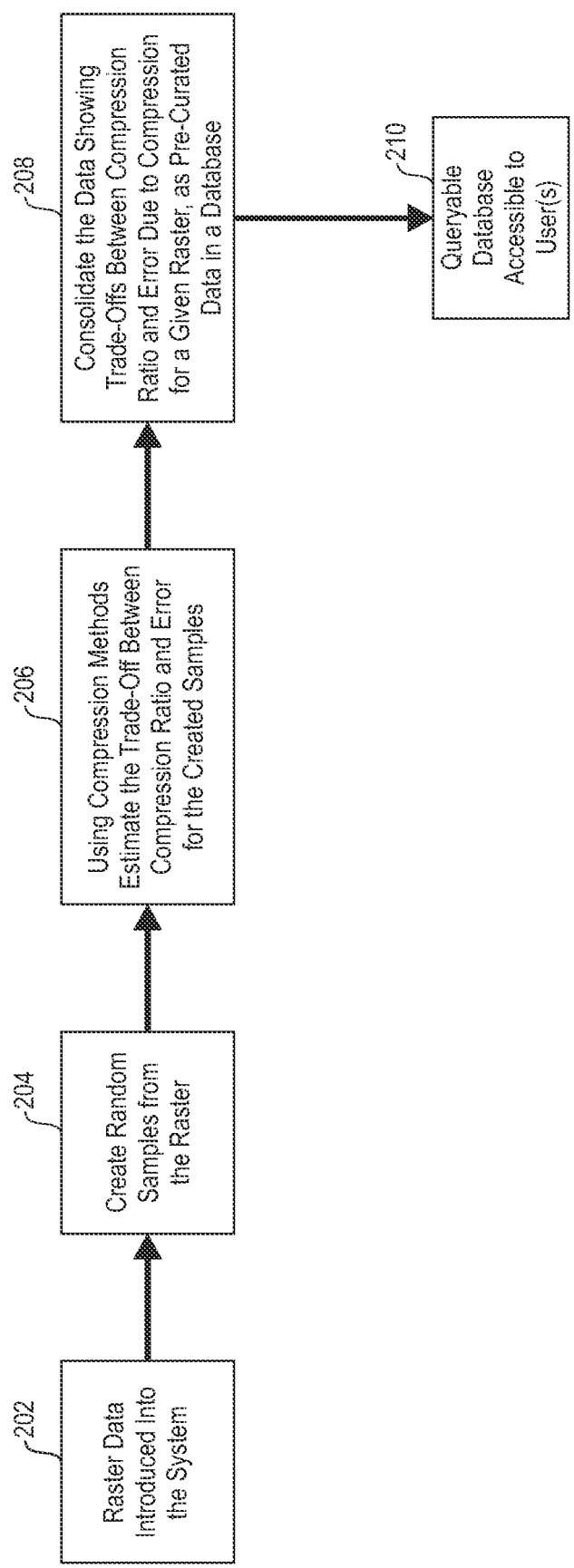
FIG. 2 is a diagram illustrating an implementation workflow, according to an example embodiment of the invention.

FIG. 2 is a diagram illustrating an implementation workflow, according to an example embodiment of the invention. In step 202, raster data is introduced into the system. When a raster is added to the system, at least a portion of the techniques detailed herein are automatically activated. In step 204, one or more random samples are created from the raster data. By way of example, from the raster data, one or more embodiments can include generating spatial samples of a given size (e.g., 256 pixels by 256 pixels) through a random sampling process. Step 206 includes implementing and/or using one or more compression methods to estimate the trade-off between at least one compression ratio and error for the one or more created samples. For each sample, at least one embodiment includes applying one or more compression techniques for different acceptable errors and estimating resulting compression ratio-error trade-offs due to compression.

As also depicted in FIG. 2, step 208 includes consolidating the data showing trade-offs between compression ratio and error due to compression for a given raster, as pre-curated data in a database (e.g., queryable database 210 accessible to one or more users). For example, in one or more embodiments, the error versus compression ratio data can be stored as data queryable by a user for making compression-related decisions.

Figure 3:
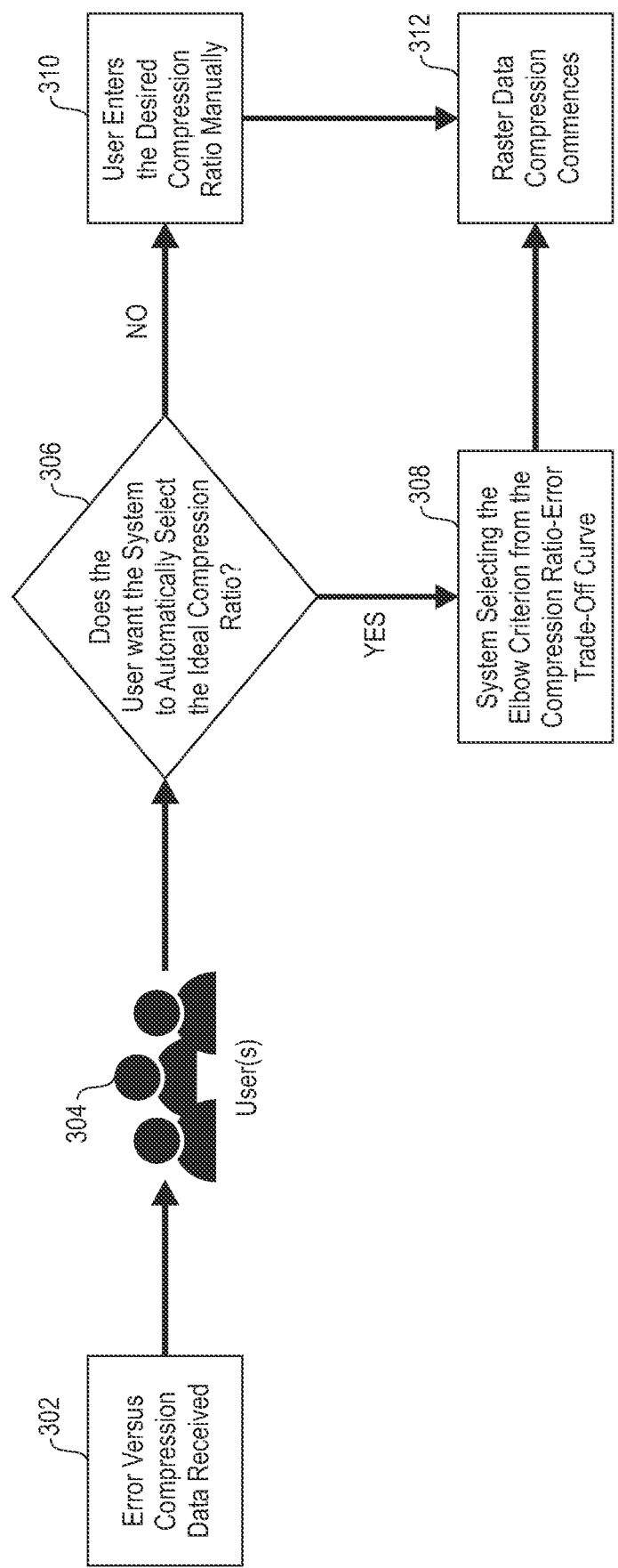
FIG. 3 is a diagram illustrating an implementation workflow, according to an example embodiment of the invention.

FIG. 3 is a diagram illustrating an implementation workflow, according to an example embodiment of the invention. Step 302 includes user(s) 304 receiving and/or obtaining error versus compression data. Step 306 includes determining whether user(s) 304 wants the system to automatically select an ideal compression ratio. If yes (i.e., the user wants the system to automatically select an ideal compression ratio), then step 308 includes the system automatically selecting the elbow criterion from the compression ratio-error trade-off curve, and step 312 includes commencing (based at least in part on the selected criterion) raster data compression (using one or more of the techniques detailed herein). If no (i.e., the user(s) does not want the system to automatically select an ideal compression ratio), then step 310 includes the user(s) entering the desired compression ratio manually, and subsequently commencing (based at least in part on the entered compression ratio) raster data compression in step 312.

In connection with such compression, one or more embodiments include implementing an encoding system for a single raster layer. By way merely of example, such an embodiment can include the user defining an acceptable error value and required speed of compression, and inputting the raster layer of interest. Additionally, such an embodiment includes creating, using at least one clustering algorithm, spatially contiguous clusters (e.g., optimal clusters), each cluster having a standard deviation that is less than the acceptable error value. Also, for each cluster, such an embodiment can include deriving one or more statistics, for example, using summary statistics and/or spatial statistics, based at least in part on the variation(s) within the cluster.

The choice of the statistics used can depend, for example, on at least one classification model used to process the variation(s) within the cluster. For instance, one or more embodiments can include identifying segments in the cluster boundaries with an identifier, representing each cluster as a combination of segment identifiers (representing the boundary and the statistics derived within the cluster), and creating a header file that conserves the metadata of the original file (.hdr.SLYR). Further, such an embodiment can include compressing this new file using loss-less compression techniques by eliminating redundancies in the file structure, and subsequently outputting the compressed file (e.g., in SLYR format).

Figure 4:
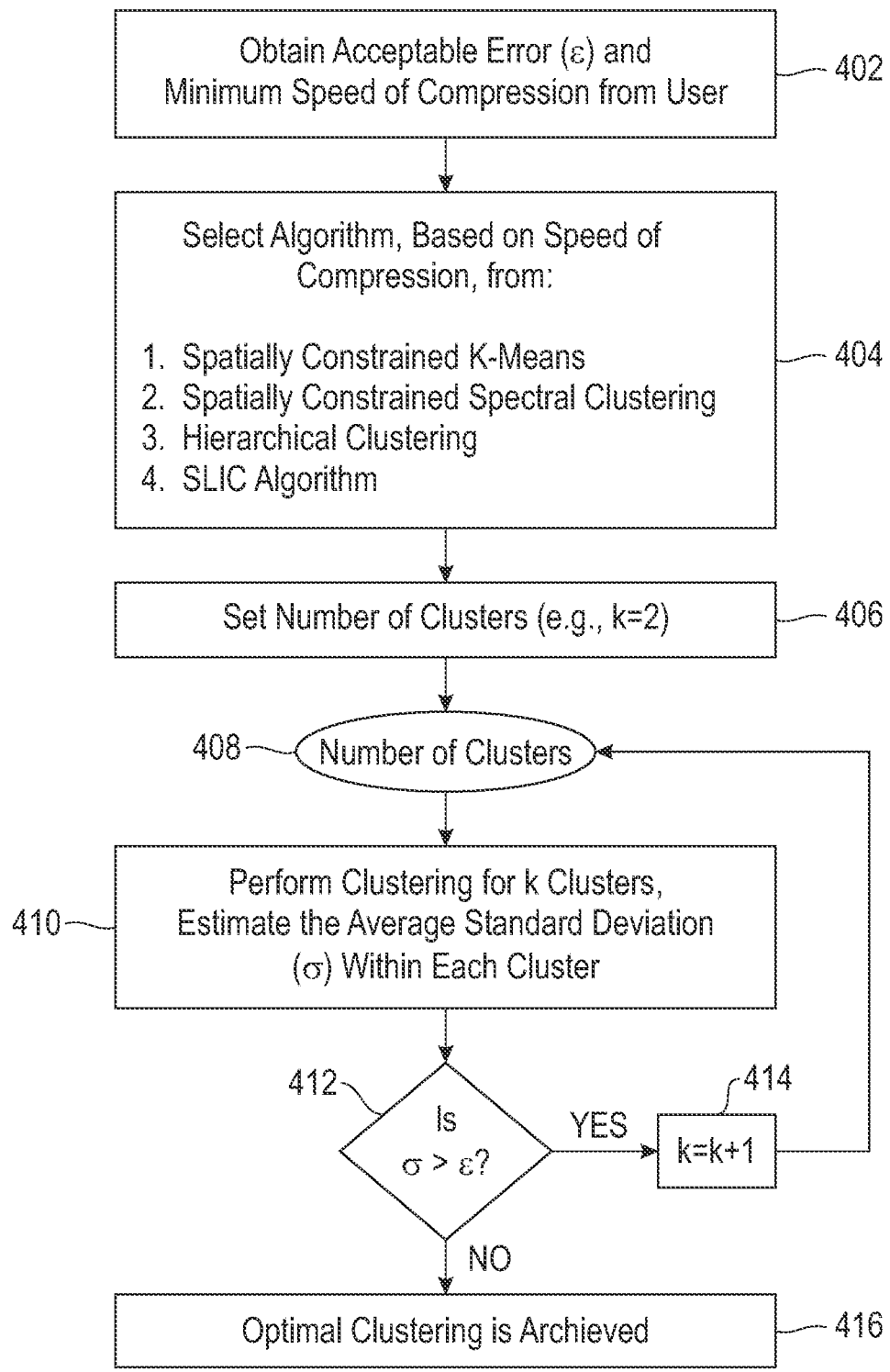
FIG. 4 is a diagram illustrating a clustering algorithm, according to an example embodiment of the invention.

FIG. 4 is a diagram illustrating a clustering algorithm, according to an example embodiment of the invention. Step 402 includes obtaining an acceptable error ($\varepsilon$) value and a minimum speed of compression value from at least one user. Step 404 includes selecting an algorithm based at least in part on the speed of compression value, wherein the algorithm can be selected from a group including, for example, at least one spatially-constrained K-means algorithm, at least one spatially-constrained spectral clustering algorithm, at least one hierarchical clustering algorithm, and at least one simple linear iterative clustering (SLIC) algorithm. Additionally, as depicted in FIG. 4, step 406 includes setting the number of clusters (e.g., k=2). Also element 408 in FIG. 4 represents a component which collects the number of clusters to be passed to the component that performs the clustering and standard deviation estimation in step 410.

Accordingly, step 410 includes performing clustering for the k clusters as well as estimating the average standard deviation ($\sigma$) within each cluster. Step 412 then includes determining whether the average standard deviation ($\sigma$) is greater than the acceptable error ($\varepsilon$) value. If yes (that is, $\sigma > \varepsilon$), then step 414 includes modifying the value of k to be k+1 and returning to step 408. If no (that is, $\sigma \leq \varepsilon$), then step 416 includes denoting that optimal clustering has been achieved.

As also detailed herein, one or more embodiments include generating statistics for each cluster. For example, in such an embodiment, spatial statistics can be calculated using multiple approaches. A first approach includes using summary statistics, wherein such an embodiment includes estimating the mean, standard deviation, maximum and minimum values for each cluster and using these estimated values during decompression. A second approach, for example, includes correlating statistics for each cluster that conserve the spatial auto-correlation within the data, wherein such statistics can include, centroid values, principal axis of the cluster, standard deviation along the major and minor principal axes, mean values, maximum, values, minimum values, etc.

In connection with compressing data, and as also noted herein, one or more embodiments include implementing an encoding system for multiple raster layers wherein a user defines an acceptable error value and a required speed of compression. By processing an input of multiple raster layers of interest using one or more clustering algorithms, such an embodiment includes creating spatially contiguous clusters (e.g., optimal clusters), wherein each cluster has a standard deviation that is less than the acceptable error. Additionally, for each cluster, spatial statistics that can be used during decompression for better accuracy are derived.

By way merely of example, such an example can include writing the following data into a file: cluster boundaries as well as the spatial statistics for each of the clusters (e.g., using JavaScript object notation (JSON) by further compressing the data using topological considerations (e.g., .data.SLYR)); and a header file that conserves the metadata of the original file (e.g., .hdr.SLYR). Additionally, one or more embodiments can include compressing this new file using loss-less compression by eliminating redundancies in the file structure, and subsequently outputting the compressed file (e.g., in SLYR format).

Additionally or alternatively, at least one embodiment includes implementing an encoding system in connection with a large raster layer, wherein a user defines an acceptable error value and a required speed of compression. Such an embodiment includes splitting the large raster layer into tiles based at least in part on one or more preset size thresholds. For each tile, such an embodiment includes creating, using at least one using clustering algorithm, spatially contiguous clusters, wherein each cluster has a standard deviation that is less than the acceptable error value. Additionally, for each cluster in the tile, such an embodiment includes deriving spatial statistics that can be used (e.g., for accuracy) during decompression.

Also, for each tile, one or more embodiments include writing the following data into a file: cluster boundaries as well as the spatial statistics for each of the clusters (e.g., using JSON by further compressing using topological considerations (e.g., .data.SLYR)); and a header file that conserves the metadata of the original file (e.g., .hdr.SLYR).

Such an embodiment can include creating the .data.SLYR and the .hdr. SLYR for each tile, and compressing all such information (for each tile) together into an .SLYR format by eliminating file redundancies.

Additionally or alternatively, in one or more embodiments, autoencoders can be used for lower-dimensional representation of data. As used herein, an autoencoder refers to a type of neural network that learn a representation (encoding) for an input dataset by compressing the dataset to a lower dimensional representation (encoding). An autoencoder can also regenerate the input from the encoding with minimal regeneration error. Such an embodiment can include building an autoencoder model on a whole data layer based at least in part on historical data and one or more land use maps (e.g., related to one-time activity), and calculating error values and compression ratio data for the data layer (i.e., the raster in a given test set) for each land use map category and time period. Also, such an embodiment includes, for a given user input (e.g., region and/or period of interest), determining if the user requirements are met based on the above-noted error values and compression data. If yes (i.e., the user requirements are met), then such an embodiment includes sharing the encoded raster and the autoencoder model. If no (i.e., the user requirements are not met), then such an embodiment includes returning the native raster to the user and/or suggesting one or more options for the user, based at least in part on the calculated error values and compression ratio, that can be achieved on the data and region and/or period of interest.

Figure 5:
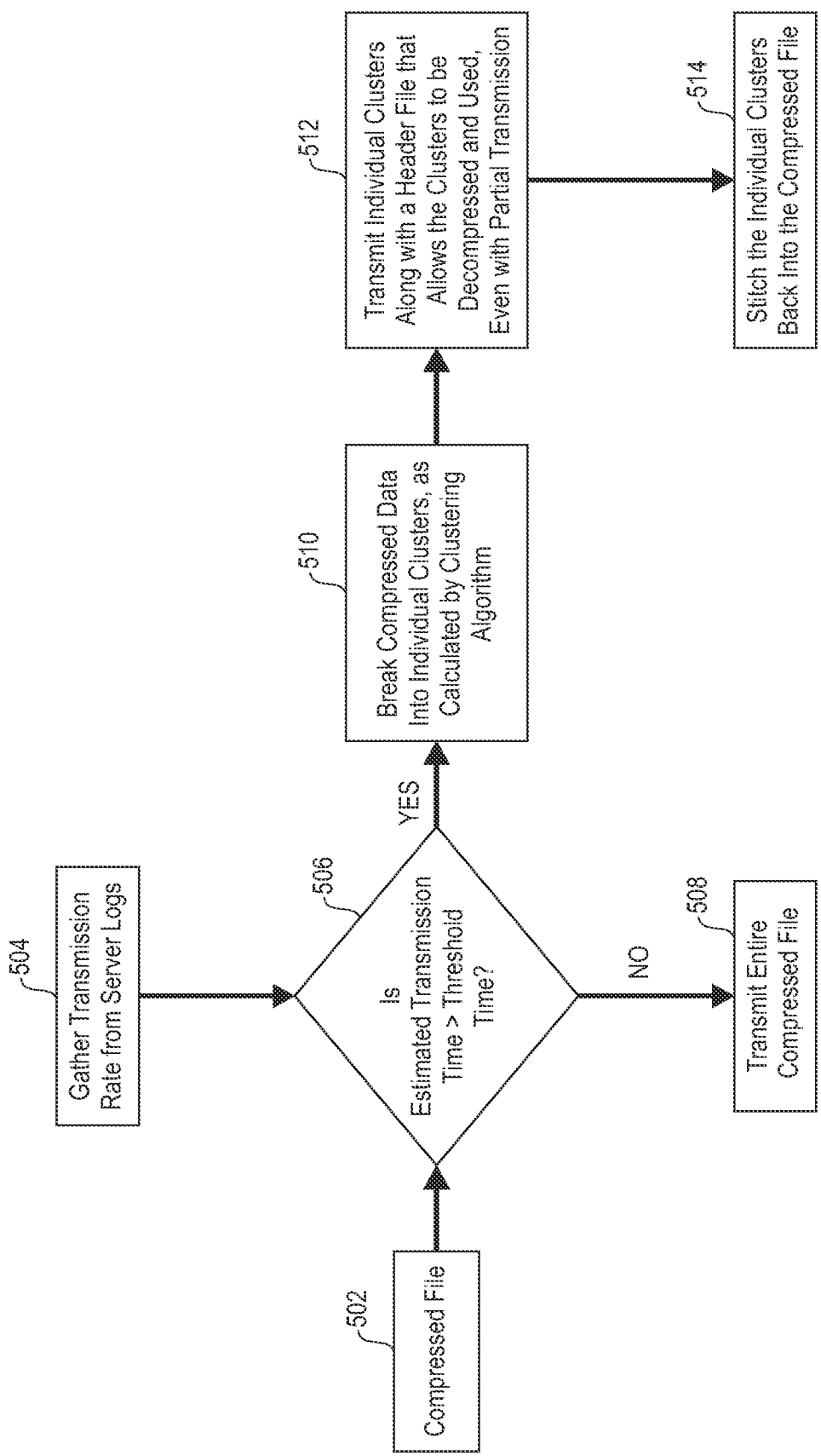
FIG. 5 is a diagram illustrating an implementation workflow, according to an example embodiment of the invention.

FIG. 5 is a diagram illustrating an implementation workflow, according to an example embodiment of the invention. As illustrated, FIG. 5 depicts a compressed file 502, while step 504 includes obtaining and/or gathering transmission rate information from one or more server logs. Step 506 includes determining, based at least in part on the compressed file 502 and the transmission rate information gathered in step 504, whether an estimated transmission is greater than the threshold time. If no (that is, the estimated transmission is less than or equal to the threshold time), then step 508 includes transmitting the entire compressed file. If yes (that is, the estimated transmission is greater than the threshold time), then step 510 includes breaking the compressed data into individual clusters, as calculated using one or more clustering algorithms (as detailed herein). As also depicted in FIG. 5, step 512 includes transmitting individual clusters along with at least one header file that allows the clusters to be decompressed and used, even with partial transmission. Further, step 514 includes stitching the individual clusters back into the compressed file. For example, in one or more embodiments, using the original compressed file metadata, the cluster segment and the boundary identifiers stored in the header file(s), the compressed file is regenerated.

Figure 6:
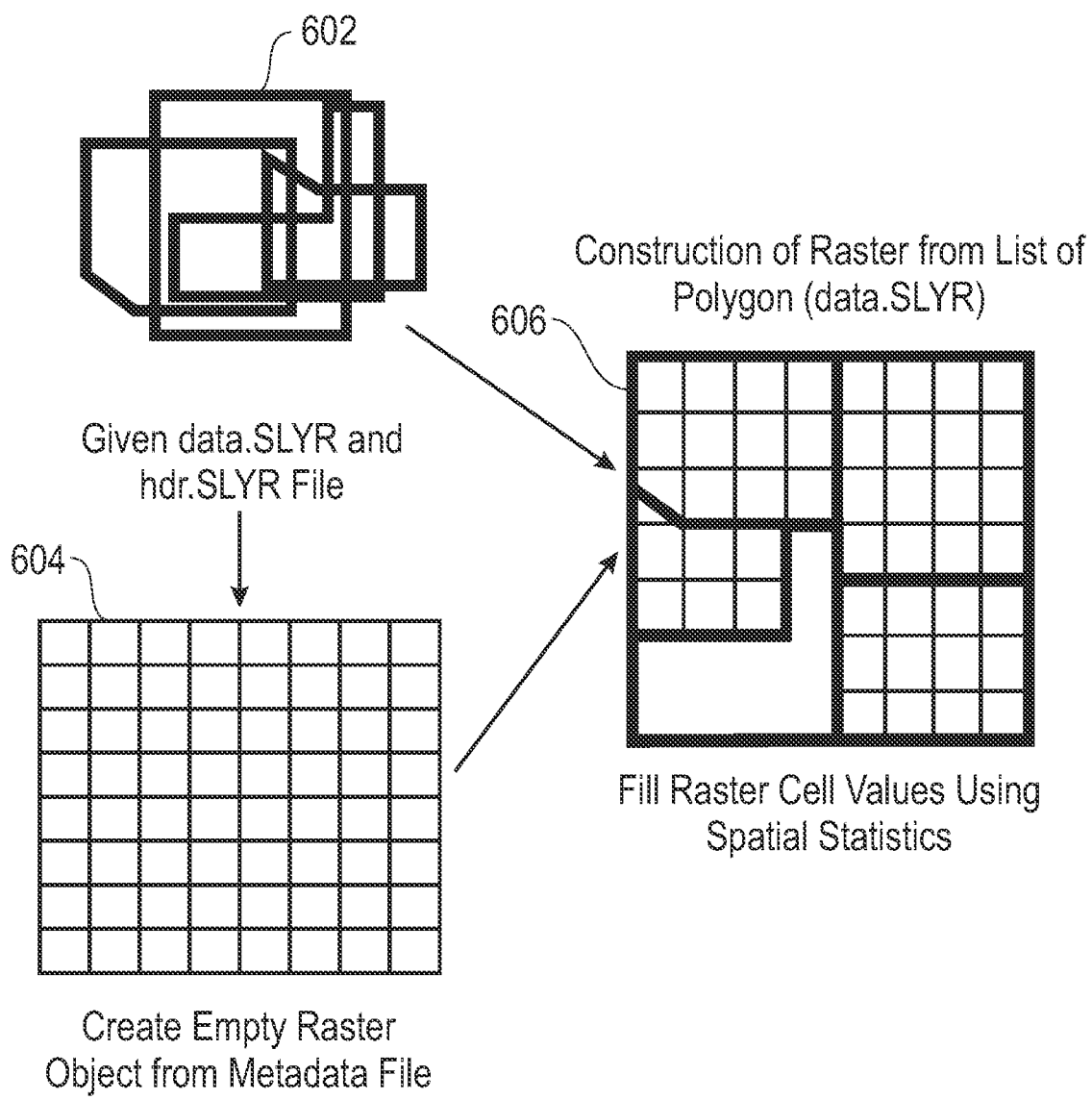
FIG. 6 is a diagram illustrating a decoding system, according to an example embodiment of the invention.

FIG. 6 is a diagram illustrating a decoding system, according to an example embodiment of the invention. By way of illustration, FIG. 6 depicts given data. SLYR and hdr.SLYR metadata files 602, which can be used to create an empty raster object 604 from at least a portion of the metadata files. Additionally, based at least in part on the metadata files 602 and the empty raster object 604, one or more embodiments include constructing a raster 606 from a list of polygons (e.g., data. SLYR), which can include filling raster cell values using spatial statistics.

Figure 7:
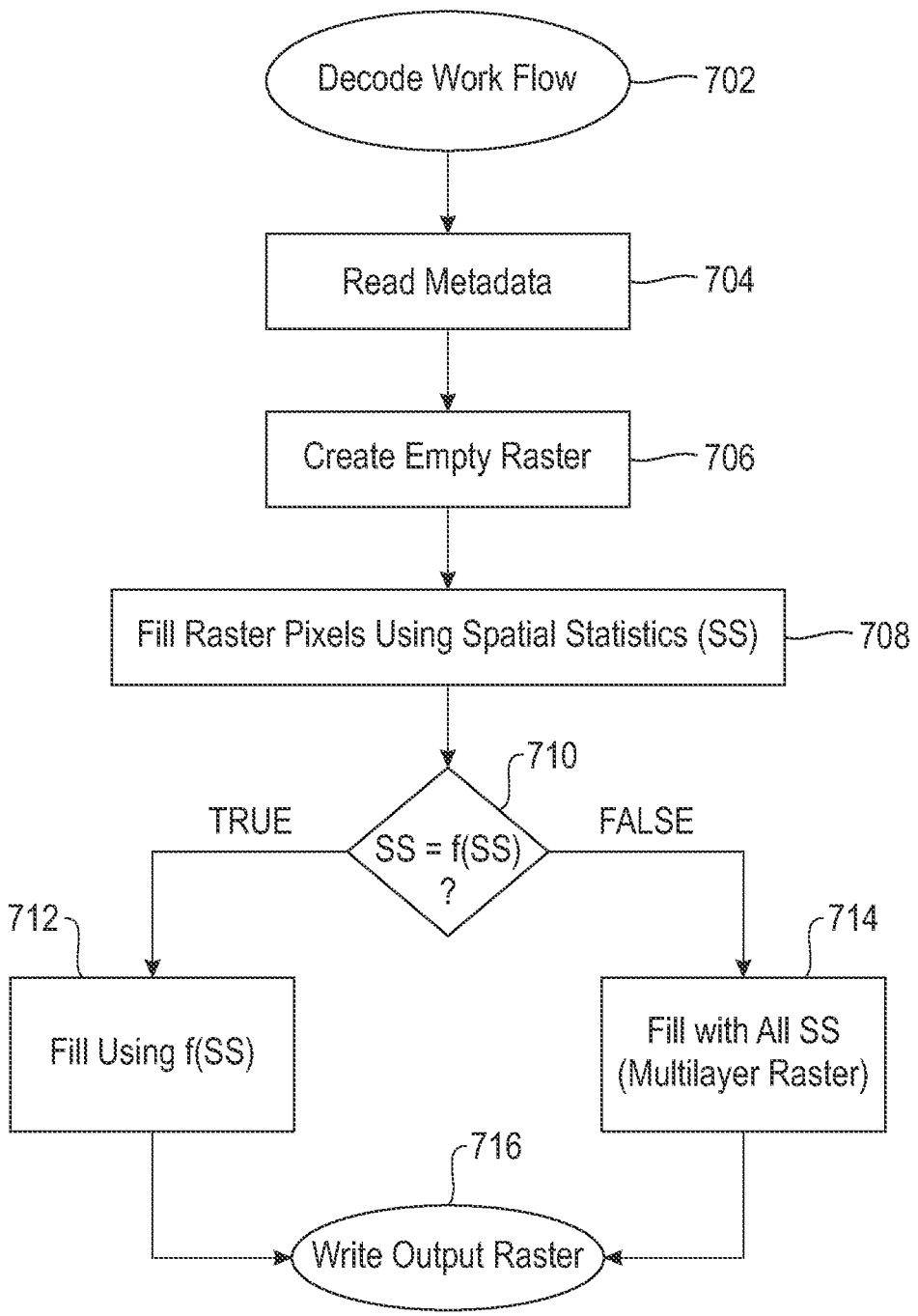
FIG. 7 is a diagram illustrating a decoding system workflow, according to an example embodiment of the invention.

FIG. 7 is a diagram illustrating a decoding system workflow, according to an example embodiment of the invention. Step 702 includes implementing a decoding workflow, and step 704 includes reading given metadata (e.g., from metadata files such as detailed in connection with FIG. 6). Step 706 includes creating an empty raster, and step 708 includes filling at least a portion of the raster pixels using spatial statistics (SS). Additionally, step 710 includes determining if SS=f(SS), wherein f(SS) represents the function used to determine if the spatial statistics regenerate a single layered raster or a multilayered raster. If yes/true (that is, SS=f(SS)), then step 712 includes filling the raster using f(SS). If no/false (that is, SS≠f(SS)), then step 714 includes filling the raster with all SS (e.g., a multilayer raster). Subsequent to step 712 and/or step 714, step 716 includes writing a corresponding output raster.

By way of further illustration, step 708 can include compiling the spatial statistics to assess in step 710, which can then include determining whether the spatial statistics match for a single layer raster or a multi-layered raster. Step 712, in one or more embodiments, is suited for generating a single layered raster whereas step 714 is suited for generating a multi-layered raster based on the metadata and spatial statistics derived from the compressed raster in (.SLYR format).

Figure 8:
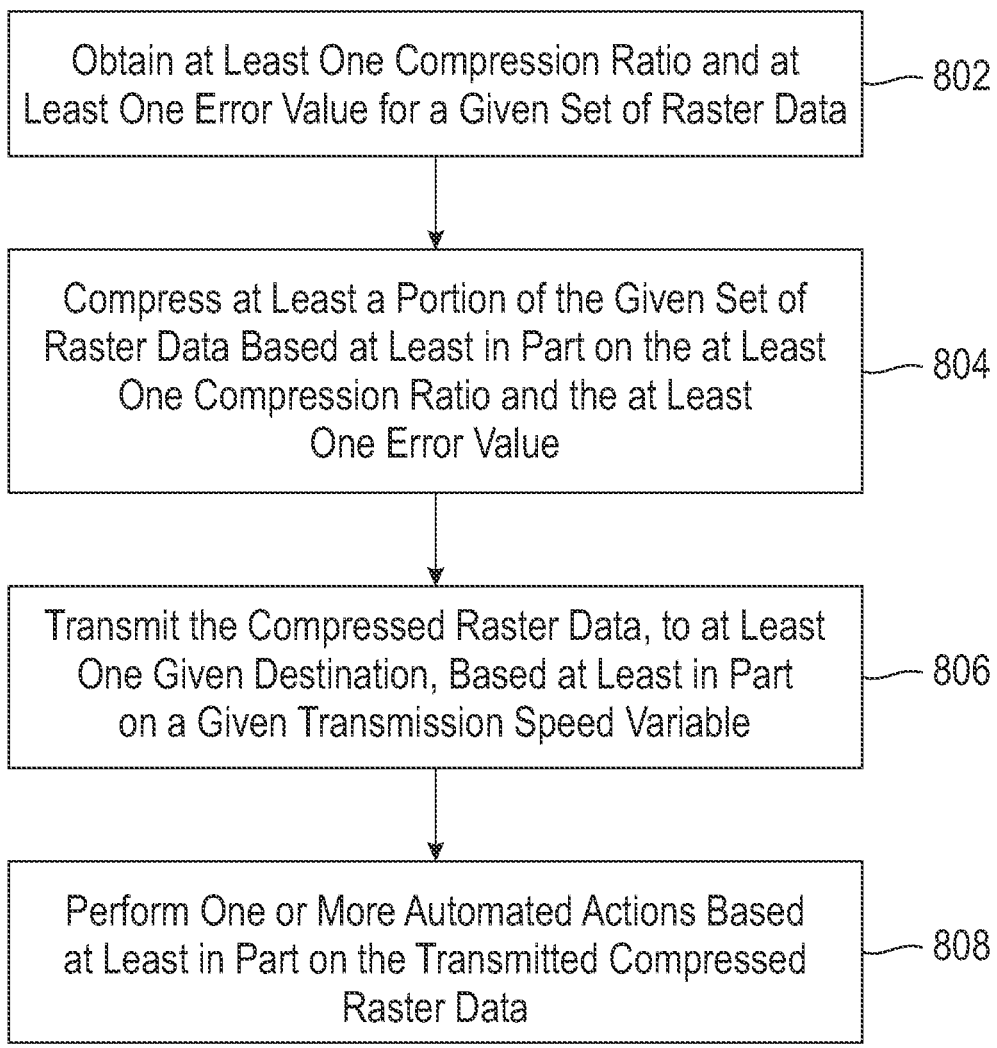
FIG. 8 is a flow diagram illustrating techniques according to an example embodiment of the invention.

FIG. 8 is a flow diagram illustrating techniques according to an embodiment of the present invention. Step 802 includes obtaining at least one compression ratio and at least one error value for a given set of raster data. In one or more embodiments, obtaining the at least one compression ratio and the at least one error value includes estimating, for at least a portion of the given set of raster data, one or more trade-offs between compression ratio and error due to compression. Such an embodiment can also include outputting the one or more trade-offs between compression ratio and error due to compression to at least one user.

Additionally or alternatively, obtaining the at least one compression ratio and the at least one error value can include facilitating user-selection of the at least one compression ratio and the at least one error value and/or automatically determining the at least one compression ratio and the at least one error value for the given set of raster data.

Step 804 includes compressing at least a portion of the given set of raster data based at least in part on the at least one compression ratio and the at least one error value. In at least one embodiment, compressing includes compressing a single raster layer, from the given set of raster data, by aggregating multiple spatial-contiguous pixels from the given set of raster data into multiple clusters, wherein aggregating the multiple spatial-contiguous pixels comprises conserving one or more spatial statistics within each cluster, and saving the compressed data to at least one specific file format. Additionally or alternatively, compressing can include compressing multiple raster layers, from the given set of raster data, into a single file by aggregating multiple spatial-contiguous pixels across the multiple raster layers into multiple clusters, wherein aggregating the multiple spatial-contiguous pixels comprises conserving one or more spatial statistics within each cluster, and saving the compressed data to at least one specific file format.

Also, in one or more embodiments, compressing can include compressing a raster layer greater than a given size threshold by partitioning the raster layer into multiple tiles, and compressing each of the multiple tiles. Additionally or alternatively, compressing can include processing at least a portion of the given set of raster data using one or more machine learning techniques. Such an embodiment can also include training the one or more machine learning techniques based at least in part on results of the compressing.

Step 806 includes transmitting the compressed raster data, to at least one given destination, based at least in part on a given transmission speed variable. In one or more embodiments, transmitting the compressed raster data includes transmitting the compressed raster data as a file and/or a set of one or more fileless key pairs.

Step 808 includes performing one or more automated actions based at least in part on the transmitted compressed raster data. In at least one embodiment, performing one or more automated actions includes decompressing at least a portion of the transmitted compressed raster data at the at least one given destination.

Additionally, in one or more embodiments, software implementing the techniques depicted in FIG. 8 can be provided as a service in a cloud environment.

It is to be appreciated that "model," as used herein, refers to an electronic digitally stored set of executable instructions and data values, associated with one another, which are capable of receiving and responding to a programmatic or other digital call, invocation, or request for resolution based upon specified input values, to yield one or more output values that can serve as the basis of computer-implemented recommendations, output data displays, machine control, etc. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer.

The techniques depicted in FIG. 8 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 8 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 9:
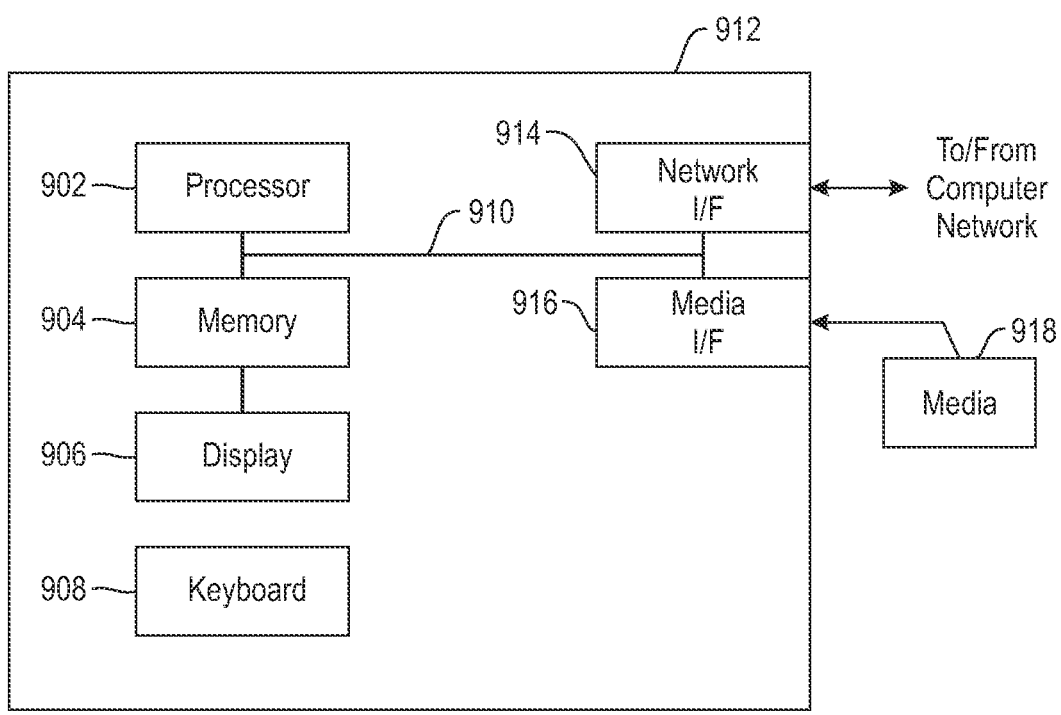
FIG. 9 is a system diagram of an example computer system on which at least one embodiment of the invention can be implemented.

Additionally, an embodiment of the present invention can make use of software running on a computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 902. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
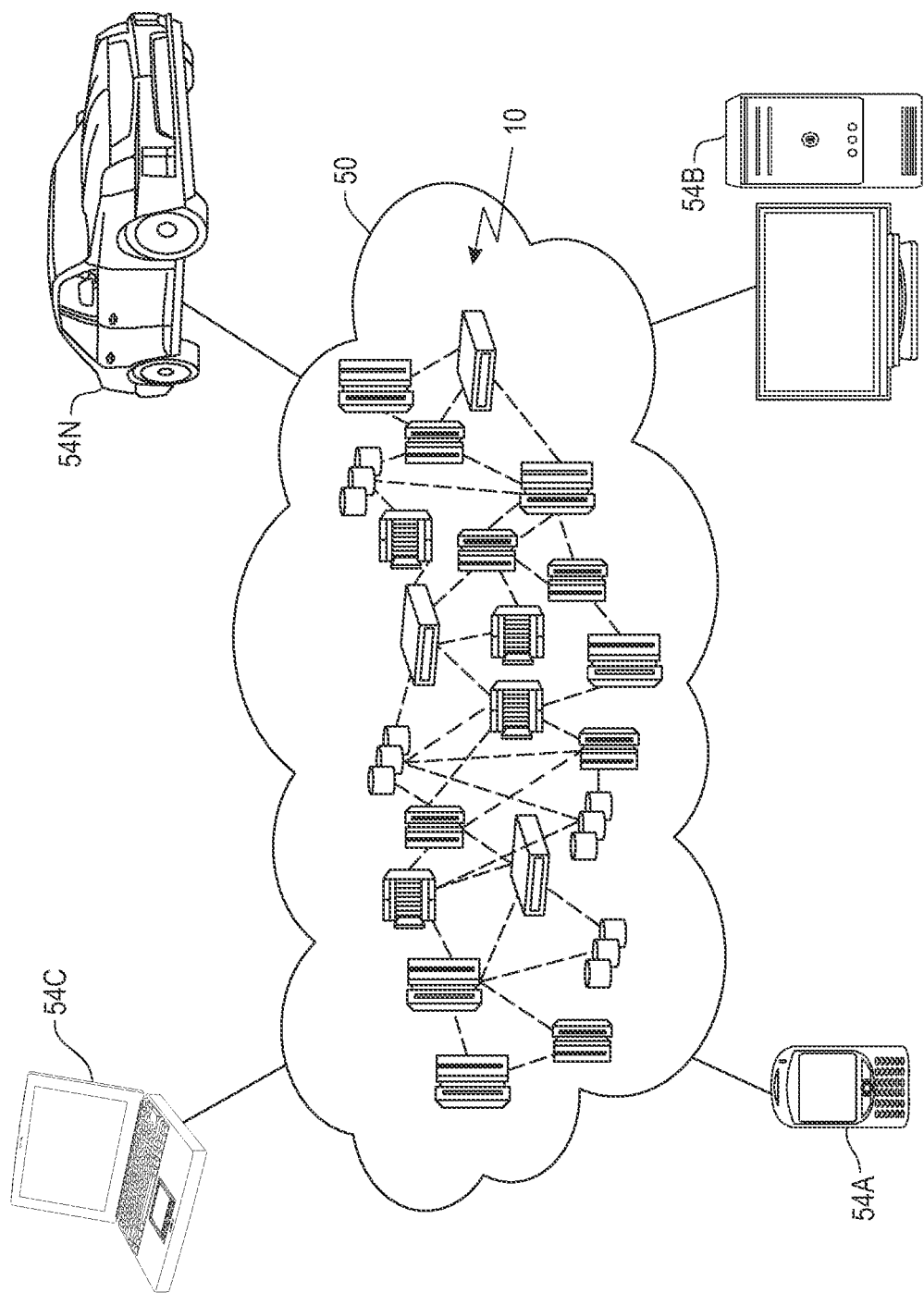
FIG. 10 depicts a cloud computing environment according to an example embodiment of the invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
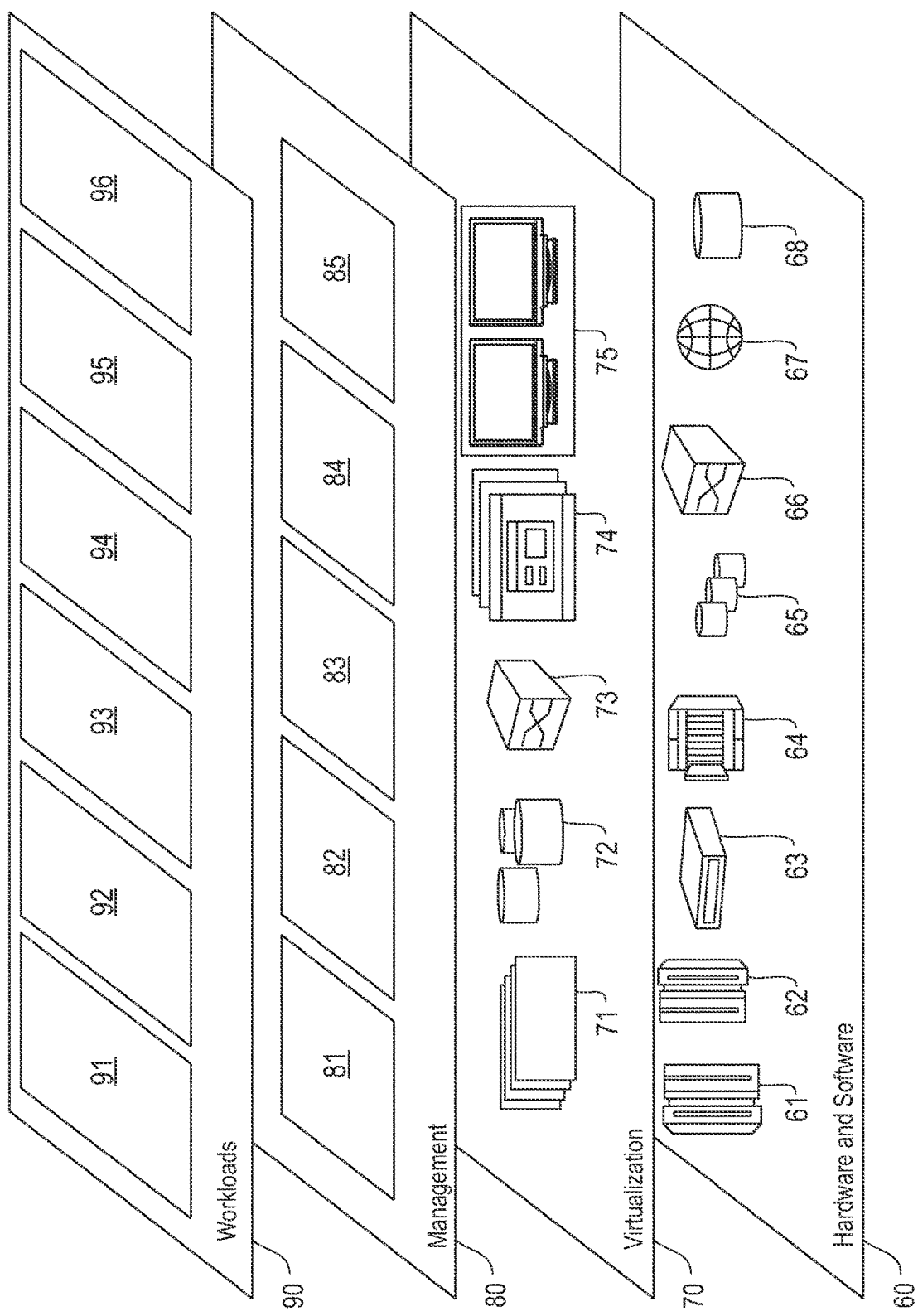
FIG. 11 depicts abstraction model layers according to an example embodiment of the invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and raster data compression 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automated stochastic compression of raster data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining, based at least in part on a user request for compression statistics and error statistics for a given set of raster data associated with a given geographic region, at least one compression ratio and at least one error value for the given set of raster data, wherein the given set of raster data comprises a set of satellite image data;
    compressing at least a portion of the given set of raster data based at least in part on the at least one compression ratio and the at least one error value, wherein compressing comprises removing at least one of one or more spatial redundancies and one or more temporal redundancies from the at least a portion of the given set of raster data, and wherein the at least a portion of the given set of raster data comprises one or more randomly-selected samples from the given set of raster data;
    transmitting the compressed raster data, to at least one given destination, based at least in part on a given transmission speed variable; and
    performing one or more automated actions based at least in part on the transmitted compressed raster data;
    wherein the method is carried out by at least one computing device.

2. The computer-implemented method of claim 1, wherein obtaining the at least one compression ratio and the at least one error value comprises estimating, for at least a portion of the given set of raster data, information associated with the at least one compression ratio and the at least one error value related to compression.

3. The computer-implemented method of claim 2: further comprising:
    outputting the information associated with the at least one compression ratio and the at least one error value related to compression to at least one user.

4. The computer-implemented method of claim 1, wherein obtaining the at least one compression ratio and the at least one error value comprises facilitating user-selection of the at least one compression ratio and the at least one error value.

5. The computer-implemented method of claim 1, wherein obtaining the at least one compression ratio and the at least one error value comprises automatically determining the at least one compression ratio and the at least one error value for the given set of raster data.

6. The computer-implemented method of claim 1, wherein compressing comprises:
    compressing a single raster layer, from the given set of raster data, by aggregating multiple spatial-contiguous pixels from the given set of raster data into multiple clusters, wherein aggregating the multiple spatial-contiguous pixels comprises conserving one or more spatial statistics within each cluster; and
    saving the compressed data to at least one specific file format.

7. The computer-implemented method of claim 1, wherein compressing comprises:
    compressing multiple raster layers, from the given set of raster data, into a single file by aggregating multiple spatial-contiguous pixels across the multiple raster layers into multiple clusters, wherein aggregating the multiple spatial-contiguous pixels comprises conserving one or more spatial statistics within each cluster; and saving the compressed data to at least one specific file format.

8. The computer-implemented method of claim 1, wherein compressing comprises:

compressing a raster layer greater than a given size threshold by partitioning the raster layer into multiple tiles; and compressing each of the multiple tiles.

9. The computer-implemented method of claim 1, wherein compressing comprises processing at least a portion of the given set of raster data using one or more machine learning techniques.

10. The computer-implemented method of claim 9, wherein performing one or more automated actions comprises training the one or more machine learning techniques based at least in part on results of the compressing.

11. The computer-implemented method of claim 1, wherein performing one or more automated actions comprises decompressing at least a portion of the transmitted compressed raster data at the at least one given destination.

12. The computer-implemented method of claim 1, wherein transmitting the compressed raster data comprises transmitting the compressed raster data as at least one of a file and a set of one or more fileless key pairs.

13. The computer-implemented method of claim 1, wherein software implementing the method is provided as a service in a cloud environment.

14. A computer program product comprising a computer readable storage medium having program instructions embodied therewith, the program instructions executable by a computing device to cause the computing device to:

obtain, based at least in part on a user request for compression statistics and error statistics for a given set of raster data associated with a given geographic region, at least one compression ratio and at least one error value for the given set of raster data, wherein the given set of raster data comprises a set of satellite image data;

compress at least a portion of the given set of raster data based at least in part on the at least one compression ratio and the at least one error value, wherein compressing comprises removing at least one of one or more spatial redundancies and one or more temporal redundancies from the at least a portion of the given set of raster data, and wherein the at least a portion of the given set of raster data comprises one or more randomly-selected samples from the given set of raster data;

transmit the compressed raster data, to at least one given destination, based at least in part on a given transmission speed variable; and perform one or more automated actions based at least in part on the transmitted compressed raster data.

15. The computer program product of claim 14, wherein compressing comprises:

compressing a single raster layer, from the given set of raster data, by aggregating multiple spatial-contiguous pixels from the given set of raster data into multiple clusters, wherein aggregating the multiple spatial-contiguous pixels comprises conserving one or more spatial statistics within each cluster; and saving the compressed data to at least one specific file format.

16. The computer program product of claim 14, wherein compressing comprises:

compressing multiple raster layers, from the given set of raster data, into a single file by aggregating multiple spatial-contiguous pixels across the multiple raster layers into multiple clusters, wherein aggregating the multiple spatial-contiguous pixels comprises conserving one or more spatial statistics within each cluster; and saving the compressed data to at least one specific file format.

17. The computer program product of claim 14, wherein compressing comprises:

compressing a raster layer greater than a given size threshold by partitioning the raster layer into multiple tiles; and compressing each of the multiple tiles.

18. The computer program product of claim 14, wherein compressing comprises processing at least a portion of the given set of raster data using one or more machine learning techniques.

19. The computer program product of claim 14, wherein obtaining the at least one compression ratio and the at least one error value comprises estimating, for at least a portion of the given set of raster data, information associated with the at least one compression ratio and the at least one error value related to compression.

20. A system comprising:

a memory configured to store program instructions; and a processor operatively coupled to the memory to execute the program instructions to:

obtain, based at least in part on a user request for compression statistics and error statistics for a given set of raster data associated with a given geographic region, at least one compression ratio and at least one error value for the given set of raster data, wherein the given set of raster data comprises a set of satellite image data;

compress at least a portion of the given set of raster data based at least in part on the at least one compression ratio and the at least one error value, wherein compressing comprises removing at least one of one or more spatial redundancies and one or more temporal redundancies from the at least a portion of the given set of raster data, and wherein the at least a portion of the given set of raster data comprises one or more randomly-selected samples from the given set of raster data;

transmit the compressed raster data, to at least one given destination, based at least in part on a given transmission speed variable; and perform one or more automated actions based at least in part on the transmitted compressed raster data.

* * * * *